May 18, 1937.   C. CARGILE   2,080,695
PRESSURE ACCUMULATOR
Filed Dec. 10, 1934
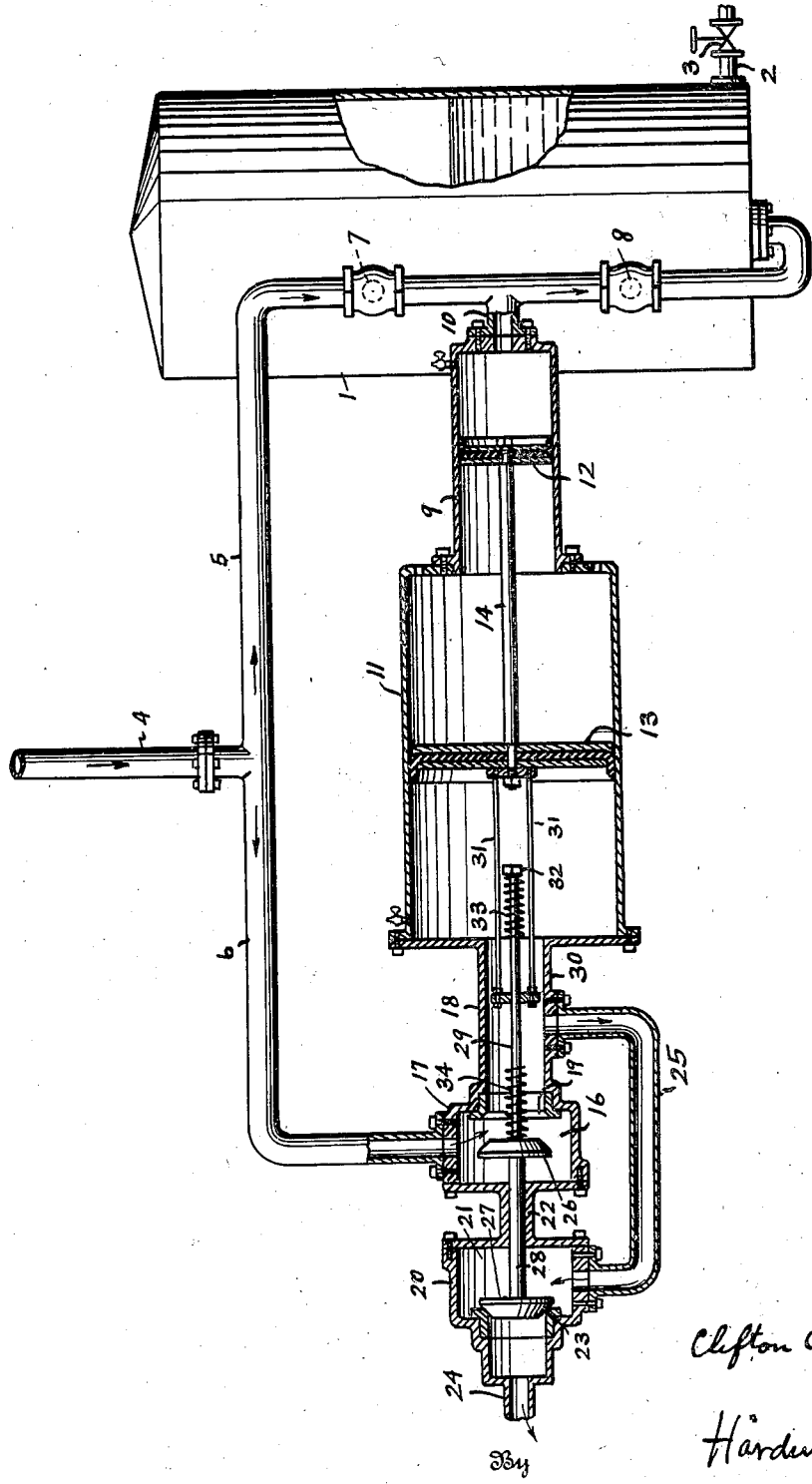
Inventor
Clifton Cargile
By Hardway Cather
Attorneys Patented May 18, 1937

2,080,695

UNITED STATES PATENT OFFICE 2,080,695

PRESSURE ACCUMULATOR

Clifton Cargile, Houston, Tex.

Application December 10, 1934, Serial No. 756,857

3 Claims. (Cl. 103—50)

This invention relates to a pressure accumulator.

An object of the invention is to provide an apparatus of the character described adapted to be connected to a tubular line for conducting liquid under pressure, and whereby the pressure may be accumulated or built up and from which the liquid may be discharged under higher pressure.

The apparatus has been particularly designed for connection into water systems, or water conveying pipes having comparatively low pressure and whereby the pressure may be increased for delivery of the water under higher pressure.

With the above and other objects in view, the invention has particular relation to certain novel features of construction, operation, and arrangement of parts, an example of which is given in this specification, and illustrated in the accompanying drawing, wherein:—

The figure shows a side elevation of the apparatus, partly in section.

In the drawing, the numeral 1 designates the pressure accumulating tank having the discharge outlet pipe 2 controlled by the valve 3. The numeral 4 designates the supply pipe through which the liquid is supplied under pressure, and this pipe is connected into the branch pipes 5, 6, the former of which enters the tank 1 and is provided with the spaced back-pressure valves 7, 8.

The numeral 9 designates a pressure cylinder which is connected, at one end, through the connection 10, into the branch pipe 5 between the valves 7, 8. A power cylinder 11 is connected to the other end of the cylinder 9 and has a larger diameter than that of the cylinder 9. Pistons 12 and 13 are fitted into the respective cylinders and are connected by means of the rigid connecting rod 14.

The other branch 6 is connected into the chamber 16 of the housing 17, and said chamber is connected into the cylinder 11 through the tubular connection 18, which is formed with a valve seat 19.

There is a waste chamber 21 contained within the housing 20 and this housing 20 is connected to the housing 17 by means of the bearing 22. The chamber 21 is provided with an outlet valve seat 23 through which the waste liquid may flow to the waste outlet 24.

A by-pass pipe is connected into the pipe 18 between the chamber 16, and the cylinder 11 and is also connected into the chamber 21.

There are the control valves 26, 27, arranged to control the respective seats 19, 23, and these valves are connected by the rigid connecting rod 28 which works through the bearing 22. The connecting rod 28 has an extension 29 through the pipe 18 and slidable on the extension 29 there is the yoke 30 which is connected to the piston 13 by the rods 31, 31. The inner end of the extension rod 29 has a head 32 thereon, and there are the coil springs 33, 34, around the extension rod 29 on opposite sides of the yoke 30, which act as resilient bumpers.

The liquid flowing through the line 4 will pass through the branches 5, 6, and will enter the tank 1 and fill the cylinder 9 in front of the piston 12 and the liquid will also enter the cylinder 11 behind the piston 13. The area of the piston 13 being greater than the piston 12, said pistons will be driven forwardly and the liquid in the cylinder 9 in front of the piston 12 being confined against backflow by the valve 7, will be forced into the tank 1, thus building up the pressure of the liquid in said tank. As the pistons move forwardly, the yoke 30 will engage the bumper 33, and reverse the position of the valves 26, 27, that is, the valve 26 will be moved into position against the seat 19 to close said seat, and the valve 27 will be moved into open position, allowing the liquid in the cylinder 11 behind the piston 13 to pass outwardly through the by-pass 25 into the chamber 21, and thence out through the waste line 24. Thereupon the pressure of the liquid flowing in through the line 4 will pass through the branch 5 and operate against the piston 12 to force the said piston backwardly but the pressure in the tank 1 will be maintained by the back-pressure valve 8. As the pistons 12, 13, move backwardly, the yoke 30 will be carried into contact with the bumper 34, and the position of the valves 26, 27, will again be reversed, that is, the valve 26 will be opened and the valve 27 closed, and the oncoming liquid may then again enter the cylinder 11 behind the piston 13, as before, forcing the pistons forwardly and forcing the liquid out of the cylinder 9 into the tank 1 under higher pressure, and the pressure will thus be built up in the tank 1 until the back pressure of the said tank equals the pressure exerted against the piston 13, whereupon the apparatus will cease to operate until the pressure in the tank 1 has been reduced, thereupon, the apparatus will resume operation to restore said reduced pressure.

The drawing and description disclose what is now considered to be a preferred form of the invention, by way of illustration only, while the broad principle of the invention will be defined by the appended claims.

What I claim is:—

1. Apparatus of the character described comprising a high pressure cylinder adapted to be connected into a supply line, a low pressure cylinder, pistons in the cylinders connected for simultaneous movement in each direction, said cylinders having inlets from the supply line, one into the low pressure cylinder behind the piston therein and one into the high pressure cylinder in front of the piston therein whereby the liquid flowing from said line may act to drive the pistons forwardly, a valve chamber between the inlet into the low pressure cylinder and the low pressure cylinder, an exhaust outlet beneath said inlet, a bypass connecting the valve chamber and the exhaust outlet, valves controlling said inlet and exhaust outlet, guide means on which said valves are mounted, guide rods on the piston in said low pressure chamber and a yoke on the said rods slidably mounted on said valve guide means to control said valves.

2. Apparatus of the character described comprising a high pressure cylinder adapted to be connected into a supply line, a low pressure cylinder, pistons in the cylinders connected for simultaneous movement in each direction, said cylinders having inlets from the supply line, one into the low pressure cylinder behind the piston therein and one into the high pressure cylinder in front of the piston therein, whereby the liquid flowing from said line may act to drive the pistons forwardly, a valve chamber between the inlet into the low pressure cylinder and the low pressure cylinder, an exhaust chamber, having an exhaust outlet, a bypass connecting the valve chamber and exhaust chamber, valves controlling said inlet and exhaust outlet, guide rods on the piston in said lower pressure chamber, means connecting the valves, said means extending into said valve chamber and forming a guide for a yoke mounted on said rods adapted to control said valves.

3. Apparatus of the character described comprising a high pressure cylinder adapted to be connected into a supply line, a low pressure cylinder, pistons in the cylinders connected for simultaneous movement in each direction, said cylinders having inlets from the supply line, one into the low pressure cylinder behind the piston therein and one into the high pressure cylinder in front of the piston therein, whereby the liquid flowing from said line may act to drive the pistons forwardly, a valve chamber between the inlet into the low pressure cylinder and the low pressure cylinder, an exhaust chamber, a bypass connecting the valve chamber and exhaust chamber, there being an exhaust outlet in said exhaust chamber, valves controlling said inlet and exhaust outlet, guide means on which said valves are mounted, coil springs mounted at the upper and lower ends of said guide means, rods on the piston in said low pressure chamber and a yoke on the rods slidably mounted on said valve guide means to control said valves.

CLIFTON CARGILE.